United States Patent [19]

Evans

[11] Patent Number: 5,445,397

[45] Date of Patent: Aug. 29, 1995

[54] STACKABLE REFUSE CONTAINER SYSTEM

[75] Inventor: David Evans, Acton, Mass.

[73] Assignee: Tucker Housewares, Inc., Leominster, Mass.

[21] Appl. No.: 236,238

[22] Filed: May 2, 1994

Related U.S. Application Data

[63] Continuation of Ser. No. 159,043, Nov. 29, 1993, abandoned, which is a continuation of Ser. No. 997,104, Dec. 24, 1992, abandoned, which is a continuation of Ser. No. 535,850, Jun. 11, 1990, abandoned.

[51] Int. Cl.$^6$ .............................. B62B 1/12; B62B 1/16
[52] U.S. Cl. ................................ 280/47.18; 280/47.19; 280/47.26; 280/79.2; 206/505; 206/508; 206/519; 220/23.83; 220/909; 211/126
[58] Field of Search ............. 280/33.998, 47.18, 47.19, 280/47.24, 47.26, 47.35, 79.2, 79.5; 206/505, 508, 511, 515, 519, 520, 821; 211/126; 220/4.27, 23.83, 23.86, 480, 524, 909

[56] References Cited

U.S. PATENT DOCUMENTS

| | | | |
|---|---|---|---|
| 3,113,680 | 12/1963 | Frater et al. | 211/126 |
| 3,252,614 | 5/1966 | Evans | 211/126 |
| 3,347,394 | 10/1967 | Gould | 211/126 |
| 3,376,046 | 4/1968 | Kivett et al. | 280/33.998 |
| 3,377,081 | 4/1968 | Ude | 280/47.27 |
| 3,383,009 | 5/1968 | Weikert | 206/508 |
| 3,398,840 | 8/1968 | Wilson | 206/505 |
| 3,403,800 | 10/1968 | Botello | 280/47.27 X |
| 3,512,696 | 5/1970 | Ebert | 211/126 |
| 3,860,309 | 1/1975 | Brendgord | 211/126 |
| 3,908,831 | 9/1975 | Brendgord | 211/126 |
| 4,015,714 | 4/1977 | Silver et al. | 206/511 |
| 4,161,252 | 7/1979 | Howells | 206/508 |
| 4,310,279 | 1/1982 | Johnston | 280/47.26 |
| 4,984,704 | 1/1991 | O'Malley | 220/909 |
| 5,038,937 | 8/1991 | DiSesa, Jr. | 206/508 |
| 5,042,674 | 8/1991 | Ramsay et al. | 206/505 X |
| 5,105,947 | 4/1992 | Wise | 206/519 |
| 5,118,124 | 6/1992 | Storay et al. | 280/47.27 X |

FOREIGN PATENT DOCUMENTS

| | | | |
|---|---|---|---|
| 0250674 | 1/1988 | European Pat. Off. | 220/23.86 |
| 1068924 | 7/1954 | France | 206/511 |
| 3014387 | 10/1981 | Germany | 206/519 |
| 3436250 | 6/1985 | Germany | 220/23.83 |
| 2108933 | 5/1983 | United Kingdom | 206/508 |
| 2136399 | 9/1984 | United Kingdom | 206/505 |
| 2252898 | 8/1992 | United Kingdom | 220/524 |

OTHER PUBLICATIONS

"Workshops" DRI Industries, Fall 1986, p. 40.
Disclosure by Rehrig Pacific Company of "Nestable/Stackable Recycle Bin" (publication date unknown).
Disclosure by Piper Casepro of "Nestable/Stackable Recycling Container" (publication date unknown).
Advertisement for "Philadelphia Can" recycling containers (publication date unknown).
Various advertisements relating to recycling containers, *Waste Age*, Jan. 1989.

Primary Examiner—Brian L. Johnson
Attorney, Agent, or Firm—Darby & Darby

[57] ABSTRACT

A stackable refuse container system includes multiple stackable containers, each of which may be designated for holding a particular recyclable material. The containers are vertically stacked and a cart can be provided for transporting the stacked assembly to and from a curb. Each container may include a removable lid, a front portion of the lid being hingably attached to provide access to the container and a second portion formed to engage and support a bottom of a complementary container. Each container also has sockets for receiving the feet of another container when a lid is not used. Thus, containers can be stacked one upon another, with the lids on or off, and mounted on the cart if one is used. The containers an be provided, for separating recyclable from non-recyclable materials at the point of origin without taking up substantial space. Utilizing the stackable refuse container system as a substitute for a conventional container makes recycling more convenient for the user and substantially increases the recycle of glass, metal and plastic materials, reducing the burden on solid waste disposal facilities.

13 Claims, 7 Drawing Sheets

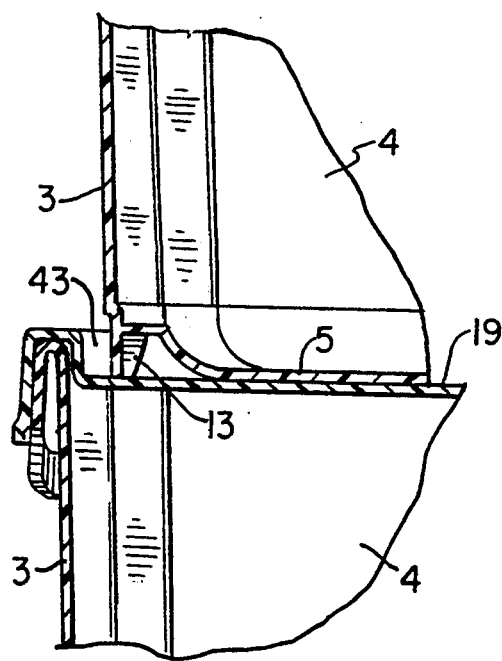
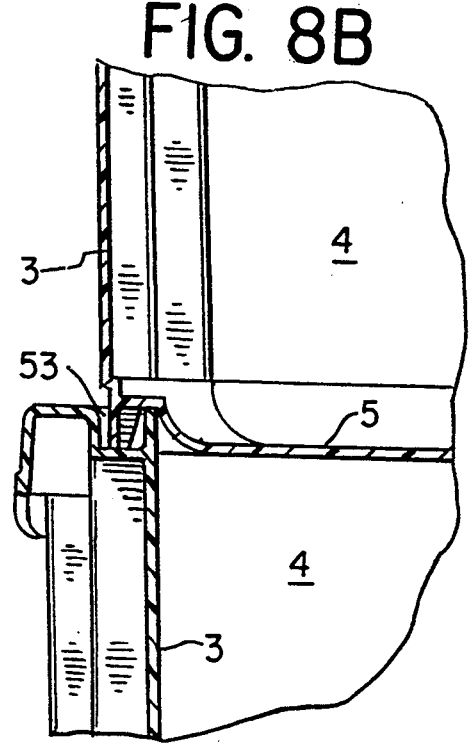
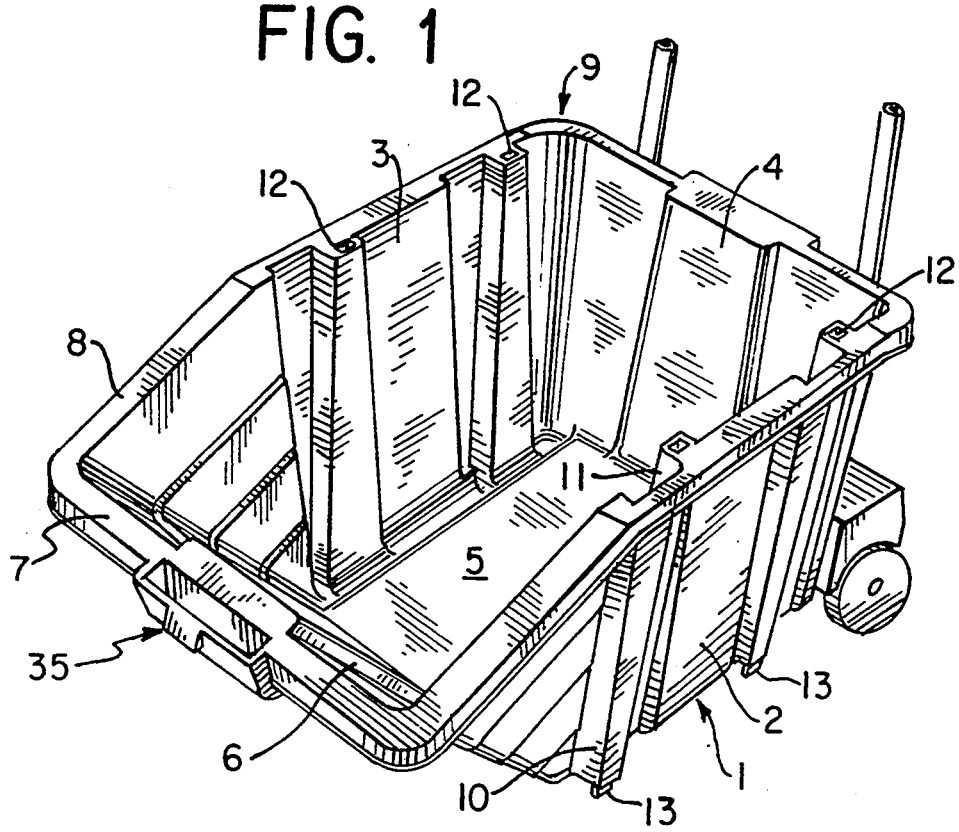

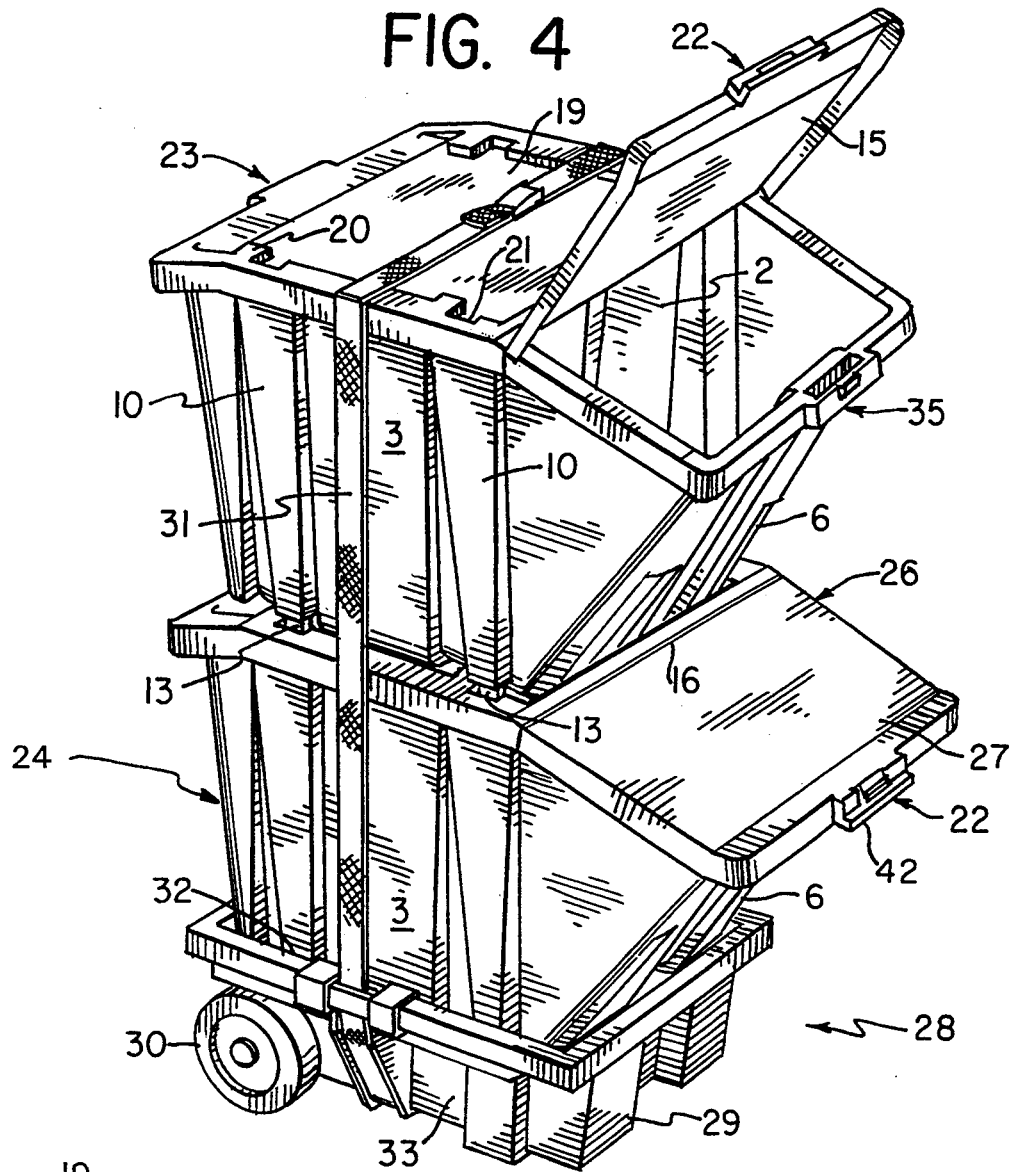
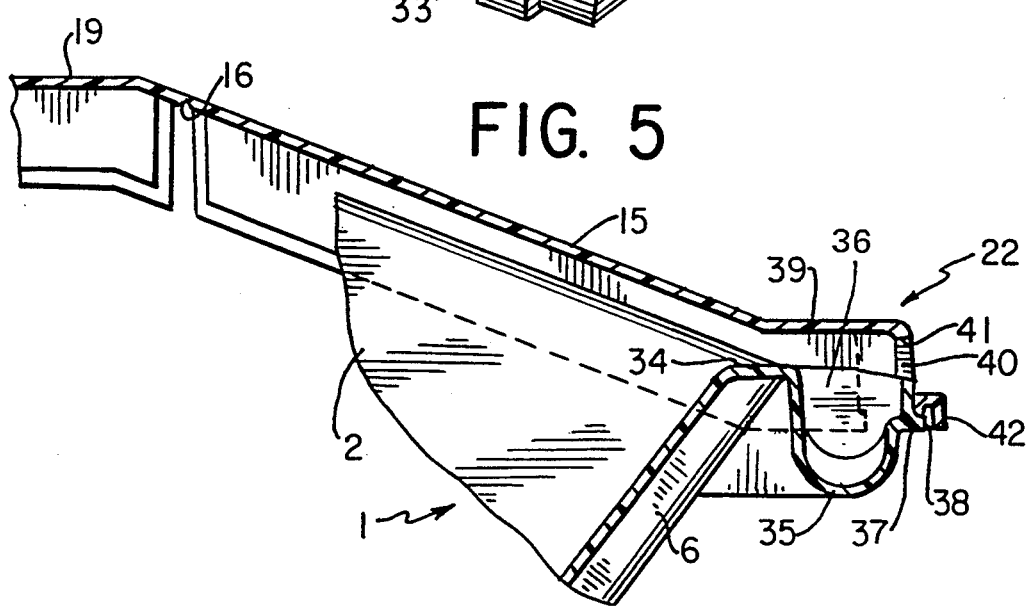

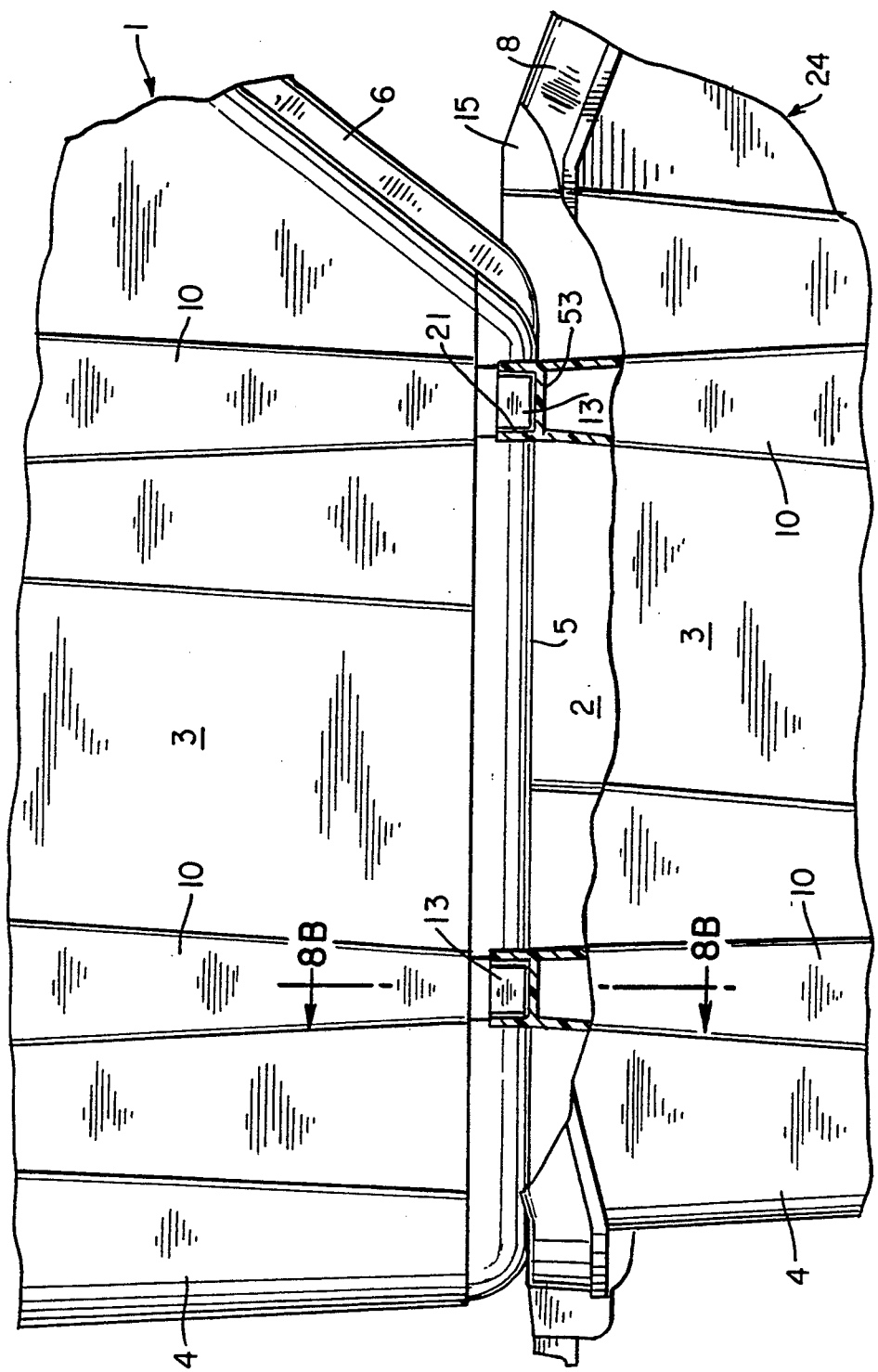

STACKABLE REFUSE CONTAINER SYSTEM

This is a continuation of application Ser. No. 08/159,043, filed Nov. 29, 1993, now abandoned, which is, in turn, a continuation of application Ser. No. 07/997,104, filed 12/24/92, now abandoned, which is, in turn, a continuation of application Ser. No. 07/535,850, file Jun. 11, 1990, now abandoned.

TECHNICAL FIELD

This invention relates to refuse containers and more particularly to a stackable refuse container system which allows separation of recyclable materials at the point of origin without requiring excessive floor space.

BACKGROUND

Various stackable containers are known in the art for holding various materials. However, there is no stackable refuse system for home use known in the art.

With the increase in disposable products, there has been a significant increase in the solid waste generated per household. A result of this increase is that many solid waste landfills are at or near capacity and new landfills are not available, due to environmental concerns, for accepting the additional waste load. Many of the solid waste items are made of recyclable materials, such as plastic, glass or metal. Previously, efforts have been made to separate these materials at the point of disposal. For example, using magnets and large screening or gravimetric equipment to separate the waste prior to incineration. The equipment involved is very expensive to purchase and maintain and is generally not completely effective. Such equipment is generally not used for landfill waste.

Efforts have also been made to have garbage separated at the point of inception, i.e., in the home. These have been unsuccessful as it is considered inconvenient to separate the recyclable materials from the non-recyclable materials. For example, if one were to have a container for each recyclable material, 3 or more trash bins would be needed and this would require too much space. Consequently, a need has arisen for a system to provide ease in separating recyclable materials from non-recyclable materials in the home without taking up substantial space.

SUMMARY OF THE INVENTION

It is an object of the present invention to provide a stackable refuse container system which takes up approximately the same space as a conventional refuse container, yet allows separation of recyclable materials from non-recyclable materials.

It is a further object of the present invention to provide separate containers, one stacked upon another, and each container can be designated for a particular recyclable material, all the containers being stackable on a cart for ease of transport to the curb for pick-up.

It is yet another object of the present invention to provide a stackable refuse container system which provides access to the separate containers in the stacked condition, each container optionally being fully closeable to minimize odors.

These and other objects of the present invention are achieved by providing a stackable refuse container system which includes a plurality of stackable containers, each container having means for supporting another container thereover. Each container optionally has lid means which are operable in the stacked condition. The system may further comprise transport means upon which the stacked containers may be located, the transport means allowing movement of the stacked containers to the curbside for pick-up.

BRIEF DESCRIPTION OF THE DRAWINGS

FIG. 1 is a perspective view of a stackable refuse container usable in the system of the present invention.

FIG. 4 is a perspective view showing two containers stacked on a cart.

FIG. 5 is an enlarged cross-sectional view of a lid locking handle of the present invention.

FIG. 7 is a cross-sectional view showing two stacked containers without using a lid.

FIG. 8A and 8B are enlarged views of the container supporting legs, FIG. 8A taken along line 8A—8A of FIG. 6, FIG. 8B taken along line 8B—8B of FIG. 7.

DETAILED DESCRIPTION OF THE PREFERRED EMBODIMENT

Figure 2:
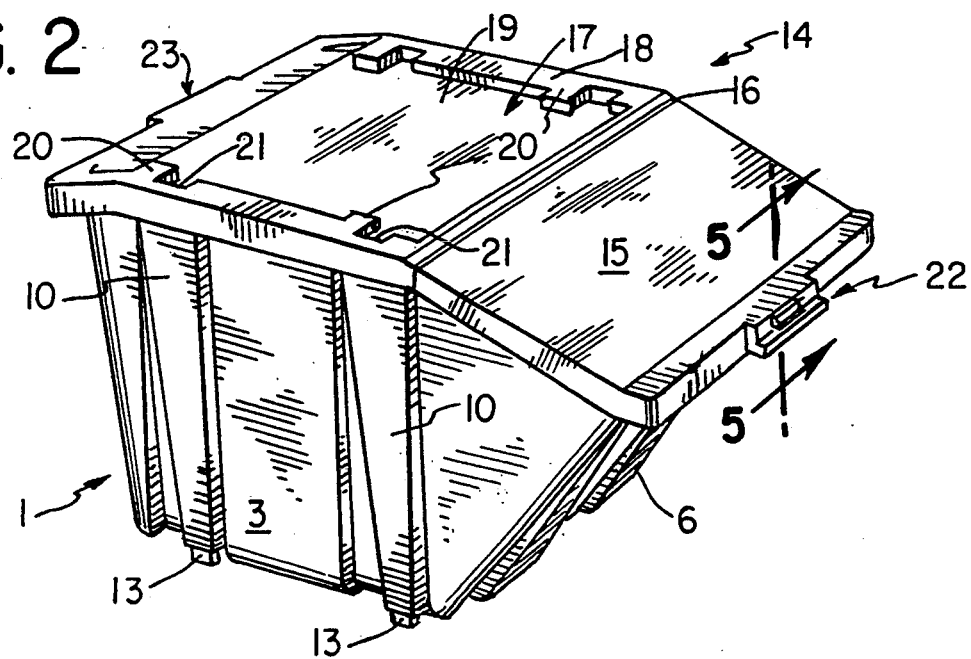
FIG. 2 is a perspective view of the container of FIG. 1 having a lid.

Referring to FIG. 1, a stackable refuse container 1 has sides 2 and 3, a back 4 and a bottom 5, with the sides and back tapering downwardly toward the bottom. The container 1 has a front wall 6 which angles forwardly to decrease the height of a forward edge 7. The container 1 also has a continuous flange 8 surrounding a top opening 9 of the container.

The flange and side walls have corresponding structures for nesting and stacking the containers. The side wall 2 has ribs 10 on the outer surface thereof which provide corresponding indents 11 on the inner surface of the side wall. The indents form guides for nesting several containers when empty. Each side wall also includes sockets 12 which are sized to receive corresponding feet 13 of a second container similar to container 1 thus providing for stabilized stacking of containers without lids on.

Referring to FIG. 2, a perspective view of the container of FIG. 1 is shown having a lid 14 disposed over the top opening 9. The lid has a front portion 15 which is attached by a hinge 16 to a container supporting portion 17. The lid has a flange 18 for receiving the container flange 8 therein, preferably with a snug fit. The container supporting portion 17 has a recessed planar surface 19 which provides support for stacking containers. By properly tapering the container sides and back, the planar surface becomes as large as or larger than the bottom, providing a planar surface sized to support another container having a similarly sized bottom. The lid 14 also has raised tabs 20 which extend from the flange 18 onto the planar surface to form slots 21 adjacent thereto for placement of the feet 13 therein.

The lid and cover are lockable onto the container by means of locking handles. The container of FIG. 1 has two locking handles 22 and 23 respectively, on a forward edge and on a rearward edge of the container flange.

Figure 3:
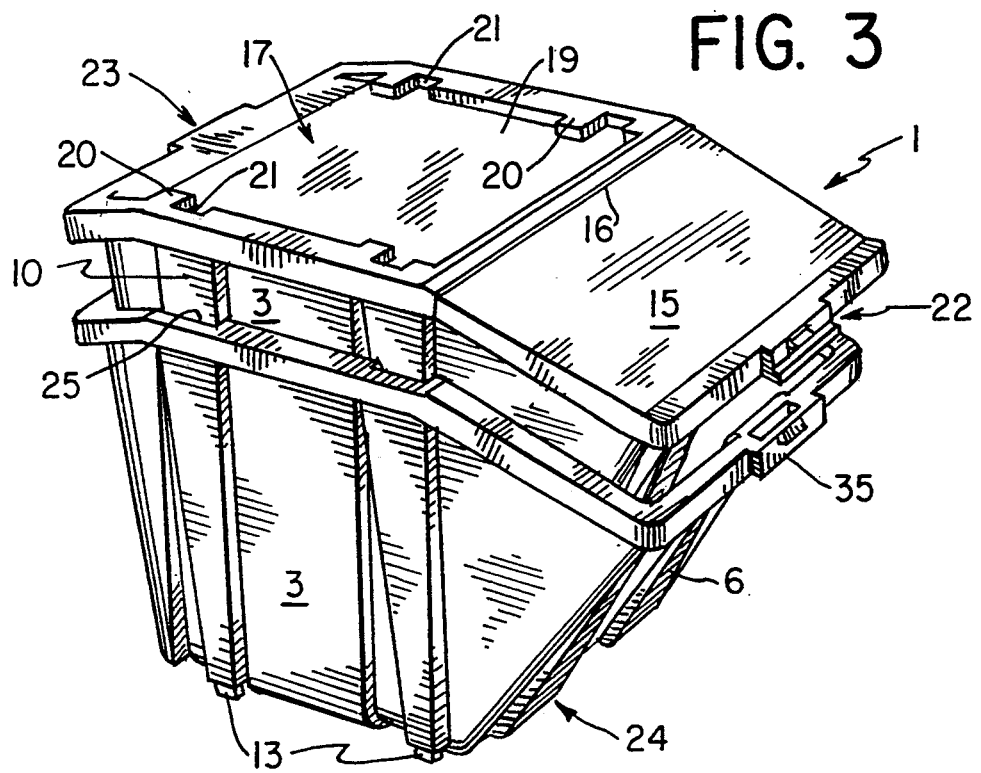
FIG. 3 is a perspective view of two containers shown in the empty, nested condition.

Referring to FIG. 3, the container 1 is nested within a second container 24. The ribs 10 are disposed within indents 25 of container 24.

Referring to FIG. 4, the container 1 is disposed on a lid 26 placed on the container 24. The container 1 has its lid front portion 15 in the open position, while a lid front portion 27 of container 27 is closed. By angling the front wall 6 of the container 1, sufficient space is provided to allow opening the lid front portion 27 to access the container 24 in the stacked condition. A cart 28 having a body portion 29, wheels 30 and a strap 31 is used to transport the containers to a curb. The body portion 29 has a receptacle 32 surrounded by side walls 33 which are sized to accept placement of the bottom of a container therein. Wheels are only shown on the back of the container to maintain stability during filling, yet allow an operator to grab the handle 23 and tilt the containers for movement to the curb.

Referring to FIG. 5, an enlarged view of the container locking handle 22 is shown. The container 1 has a forwardly extending portion 34 which meets with a U-shaped projection 35 and has sidewalls 36, with a space between the portion 34, the projection 35 and side walls 36 defining a finger pocket for lifting the container. A forwardly extending lip 37 is provided with a front surface 38. The lid front portion 15 has a forwardly extending portion 39 and a vertical wall 40 which has an opening 41 within which the lip 37 is mateable. An outwardly extending portion 42 provides a means for gripping the lid front portion to be pulled forwardly to resiliently disengage the lip from the opening. This allows the cover to be opened. The lid is shown just prior to engagement with the container.

Figure 6:
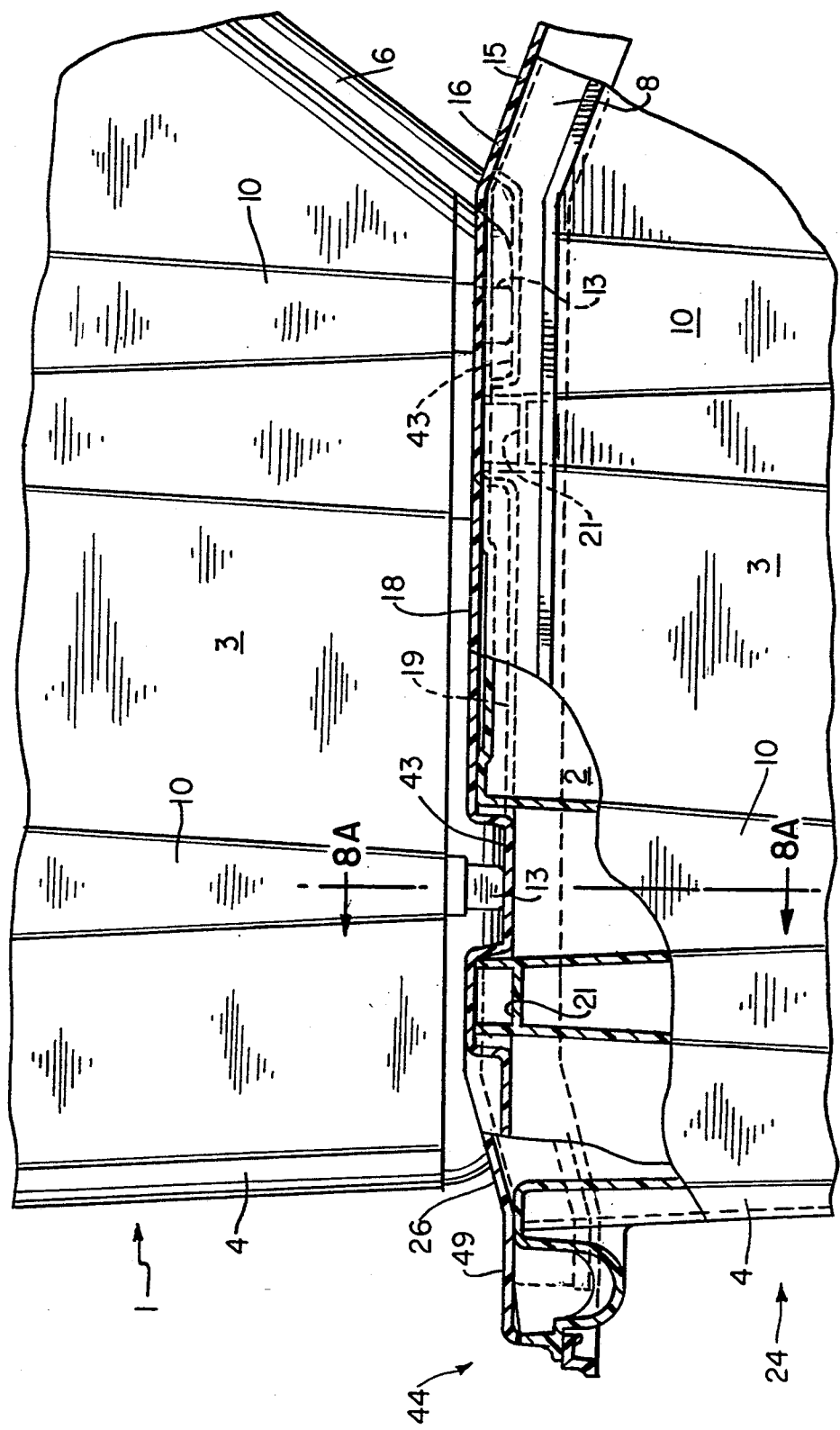
FIG. 6 is a cross-sectional view showing two stacked containers using a lid.

Referring to FIG. 6, container 1 is shown stacked on the container 24. The container 24 has the lid 26, with the feet 13 of the container 1, resting in slots 43. FIG. 8a shows the slots and feet in cross-section. Referring again to FIG. 6, a rear locking handle 44 is shown in cross-section which is similar to the front locking handle 22. The container 24 has an extending portion 45, a U-shaped projection 46, which has a lip 47 extending therefrom, and side walls 48, together defining a pocket for lifting. The lid 26 has an extending portion 49, a vertical wall 50, an opening 51, and an outwardly extending projection 52. The lid is shown in engagement with the container.

Referring to FIG. 7, the container 1 is shown stacked on the container 24 which does not have a lid. The container 24 has sockets 53 sized to accept feet 13 therein. This provides stability with maximum access to the container. FIG. 8B shows the socket in enlarged cross-section.

Figure 9:
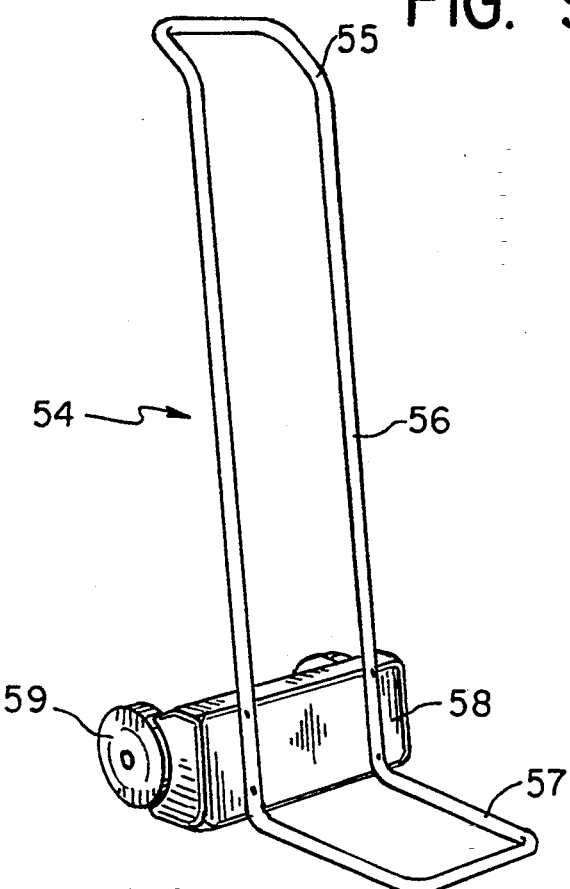
FIG. 9 is a perspective view of another cart embodiment.

Referring to FIG. 9, another embodiment of a cart usable with the present invention is shown. A cart 54 has a handle 55, a vertical support 56 and a container receiving bottom 57. For simplicity of construction, these three portions are shown made of a unitary bent tubular structure. The tube is bent to provide an angled handle and the bottom is bent perpendicular to the vertical support to engage the bottom of a container. The container receiving bottom is sized to engage a substantial portion of the container bottom for maximum stability. The vertical support 56 is attached to a base 58 which has a pair of wheels 59. Similar to the other cart, this cart is tilted to effect movement.

Figure 10:
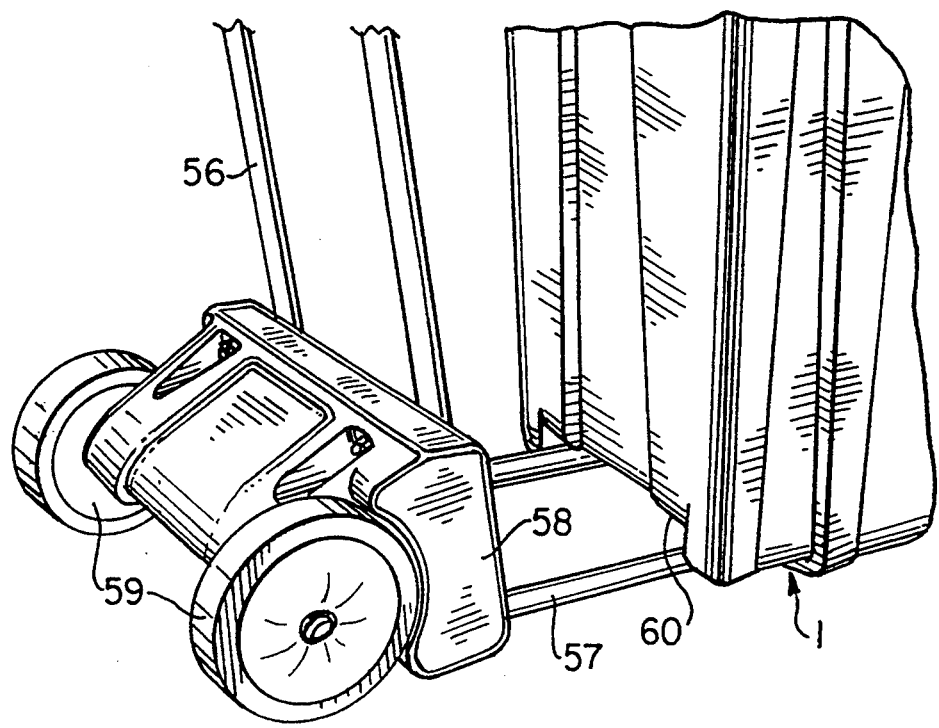
FIG. 10 is a rear view of a container partially engaged by the cart of FIG. 9.

Referring to FIG. 10, the container 1 is shown partially engaged with the cart of FIG. 9. The container 1 has a formed receptacle 60 in the back wall and bottom to accept placement of the container receiving bottom 57 therein. The container receiving bottom is simply slid within the receptacle and the cart is tilted back to move the containers to the curb.

Some containers should be larger than other containers due to the different amounts of recyclable waste generated in a particular time period. To increase the size of the container while maintaining stackability, the walls of the container can be increased in height while the bottom remains the same size. Thus, the capacity of one container can double or triple in size without affecting stackability.

Figure 11:
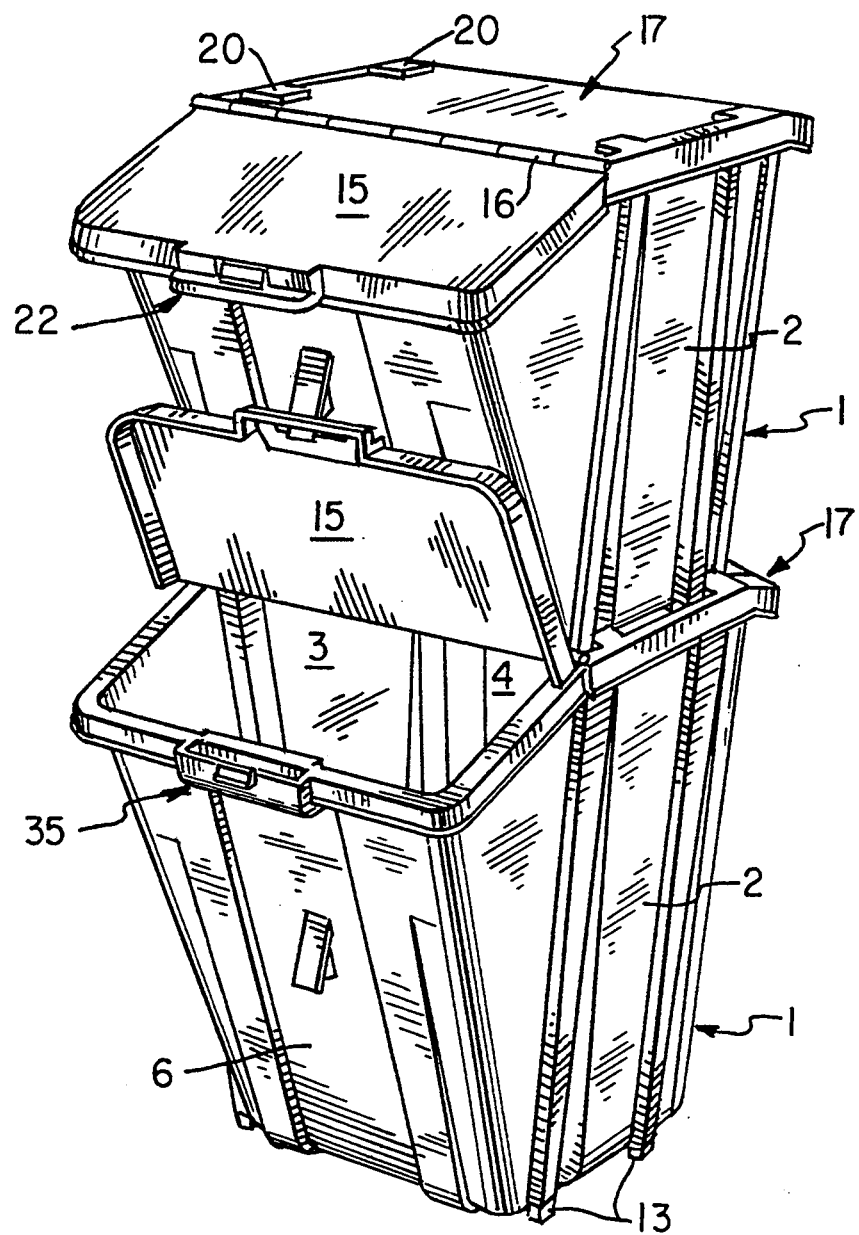
FIG. 11 is a perspective view showing two stacked containers of different volume, each having a lid latch.

Referring to FIG. 11, two containers 61 and 62 of different volume are shown, each container additionally includes a lid latch 63 disposed on a front wall 64 thereof. The latch has a projection 65 which extends from the latch in an amount sufficient to engage an opening 66 in a lid 67. The latch locks the lid in the open position.

While providing a cover or lid on each container is important for reducing odors which would facilitate usage, some municipalities require containers without lids. Thus, the containers of the present invention give the user the option of maintaining the containers with lids for normal household use and then removing the lids prior to bringing the containers to the curb.

The container of the present invention may be made of any moldable plastic material such as polyethylene or polypropylene. The lids may be made of a similar material and should be suitably resilient to effect lid locking. The front portion of the lid may be hinged using a separate rod insertable through a plurality of interleaved cylinder openings or be of a unitary molded structure having a resilient seam for acting as a hinge or may use a molded-in hinge arrangement where the front portion snaps onto the lid.

While tapered strengthening ribs, slots and other formed structures are used for supporting the stacked containers, it will be understood that various other shapes could be used with the container of the present invention. In addition, while two handles are shown on an individual container, it will be understood that the number of handles required for a particular container is dependant on the application to which it will be put, and thus, any number of lacking handles can be included. Also, while a particularly sized container is shown, it will be understood that the sizes and shapes of the container are relative and that many different size stackable containers could be provided, depending on the needs of the user.

I claim:

1. A stackable container adapted to nest in, stack on top of, and stack below another similarly constructed container comprising:
   a container body having a bottom and front, back and side walls and an open top, said side walls each having an inner periphery and a top edge, the front wall of the container being angled downwardly and inwardly relative to the other walls of the container body, and the top edge of a front portion of each of the side walls sloping downwardly, the container walls sloped inwardly to permit said nesting of the container in said other container;
   a continuous flange forming a border around the open top;

mating means on said container walls for stacking said other container thereon, said mating means comprising at least one socket on at least one of said walls of the container and formed as part of the inner periphery of the wall, said at least one socket being sized to accept from the other container at least one foot of the same size and comparable shape, said foot extending downwardly from at least one wall of the other container;

at least one handle including a first forwardly extending portion with a vertical projection of generally U-shaped cross-section spaced away from the container body for gripping; and a removable lid having back, side and front edges, and sized to fit the open top and having a mating flange defining a periphery thereof along the lid back and side edges, the mating flange having a recess sized to accept the continuous flange of the container body therein, the lid further having a front portion hingedly attached to the lid front edge, the flange on the container front having an outwardly extending lip and said lid front portion having a forwardly extending portion, and an opening sized to accept the flange lip therein for locking the lid to the container;

whereby access into the container, when said other container is stacked thereon, is provided at the container body open top, along the downwardly inwardly sloping front wall, and between the side wall front portions of the container and adjacent the downwardly inwardly sloping front wall of the other container.

2. A container as in claim 1 wherein said mating means are located on the opposing side walls of a container.

3. A container as in claim 2, said bottom wall having outer edges, wherein there are a pair of said mating means spaced apart on each side wall and corresponding pairs of mating means adjacent the outer edges of said bottom wall.

4. A container as in claim 3 wherein there are a pair of said mating means spaced apart on each side wall and 5. A stackable refuse container comprising:
a container body having an open top defined by a connected bottom wall and vertical back and side walls, each side wall having a downwardly outwardly sloping front part, said bottom wall having an outer edge;

a front wall of the container connected to said side wall front parts and being angled downwardly and inwardly relative to the container body;

a continuous flange forming a border around the open top, the container including mating means for stacking a second container thereon, said mating means comprising at least one socket on one of said vertical walls, sized to accept at least one foot formed on the bottom of a said second container, a removable lid having a front portion and a rear portion, said lid sized to fit the open top and the front portion hingedly attached to the lid, and latch means on the front wall of the container for holding in an open position a corresponding front portion of a lid of a next lower container when said container is stacked on top of said next lower container.

6. A container as in claim 5 wherein said mating means are located on the two opposing side walls of a container.

7. A container for a stackable container system, said container comprising:
a bottom wall with a connected generally vertical back wall and a first section of each of a pair of side walls, said back and side wall first sections having a top edge, each of said side wall first sections having a forward end, a second side wall section having a forward edge extending from the forward end of each side wall first section and having a downwardly sloping top edge, a front wall having a top edge and connecting the forward edges of said side wall second sections, a cover having a first part fitting over the top edges of said back wall and side wall first sections, and a second part pivotally hinged to a front edge of said cover first part and adapted to fit over the top edges of said side wall second sections and said front wall, said cover second part being pivotable away from the top edges of said side wall second sections and said front wall with the cover first section remaining in place, mating means on said cover second part and on the container front wall adapted to permit said cover second part of the container to be held in an open condition latched to a front wall of a second container similar to said container and stacked on top of said container.

8. A container for a stackable container system, said container comprising:
a bottom wall with a connected generally vertical back wall and a first section of each of a pair of side walls, said back and said side wall first sections having a top edge, each of said side wall first sections having a first end and a second end, a second side wall section having a forward edge extending from the first end of each side wall first section and having a downwardly sloping top edge, a front wall connecting the forward edges of said side wall second sections, said front wall having a top edge, a cover having a first part, said first part having a front edge, said first part firing over the top edges of said back wall and said side wall rest sections, and a second part pivotally hinged to the front edge of said cover first part and adapted to fit over the top edges of said side wall second sections and said front wall, said cover second part being pivotable away from the top edges of said side wall second sections and said front wall with the cover first section remaining in place, a stacking means on the cover first part of the container for accepting or stacking a mating stacking means on a bottom wall of a second container similar to said container, the cover first part and the container bottom wall being of substantially the same size to permit the cover second part of the container to be freely opened toward a front wall of the second similar container when stacked on the cover first part of the container, and mating means on a corresponding cover second part of a third container similar to the container and on the container front wall for permitting said cover second part of the third container to be held in an open condition when the container is stacked on top of the third container.

9. A stackable container comprising:
a container body having a bottom and front, back and side walls and an open top, said side walls having a top edge, the front wall of the container body being angled downwardly and inwardly relative to the other walls of the container body and the top edge of a front portion of each of the sidewalls sloping downwardly;
a continuous flange forming a border around the open top;
mating means included on the container walls for stacking a second container of similar construction thereon, said mating means comprising at least one socket on at least on wall of the container sized to accept therein at least one foot of the same size and comparable shape located on a bottom of the second container;
whereby access to the open top of the container, when said second container is stacked thereon, is provided at the container body open top, along the downwardly inwardly sloping front wall and between the side wall front portions of the container and adjacent the downwardly inwardly sloping front wall of the second container; and
at least one handle on one of said container walls including a first forwardly extending portion with a vertical projection of generally U-shaped cross-section spaced away from the container body and adapted for gripping; and
a removable lid having a top and back, side and front edges and being sized to fit the open top and having a mating flange defining a periphery thereof, the mating flange having a recess sized to accept the continuous container body flange therein, the lid having a front portion hingedly attached to the lid front edge, the top of said lid including formed structures sized and positioned to accept said at least one foot located at the bottom of the second container for supporting the second container.

10. The container of claim 9 wherein the formed structures comprise slots.

11. A container for a stackable container system, said container comprising:
a bottom wall with a connected generally vertical back wall having a top edge and a connected first section of each of a pair of side walls, each of said side wall first sections having a first end and a second end;
a side wall second section having a forward edge extending from the first end of each side wall first section and having a downwardly sloping top edge;
a front wall having a top edge and connecting the forward edges of said side wall second sections, said back, side and front walls and the top edges thereof defining a fully open top;
a cover having a first part fitting over the top edges of said back wall and said side wall first sections, and a second part pivotally hinged to a front edge of said cover first part and adapted to fit over the top edges of said side wall second sections and said front wall, said cover second part being pivotable away from the top edges with the cover first section remaining in place; and
stacking means on the cover first part of the container for accepting a corresponding mating stacking means on a bottom wall of a second container similar to said container when said second similar container is stacked on top of said container.

12. A container as set forth in claim 11 wherein said mating means for stacking comprise a plurality of sockets on one of said cover first part and container bottom wall and a plurality of mating posts on the other of said cover first part and bottom wall.

13. A container as set forth in claim 11 wherein the cover first part and the container bottom wall are of substantially the same size to permit the cover second part of the one container to be freely opened toward the front wall of the other similar container stacked on the cover first part of said one container.

* * * * *